United States Patent
Hirano et al.

(10) Patent No.: US 10,308,254 B2
(45) Date of Patent: Jun. 4, 2019

(54) VEHICLE CONTROL DEVICE

(71) Applicant: TOYOTA JIDOSHA KABUSHIKI KAISHA, Toyota-shi, Aichi (JP)

(72) Inventors: Maiko Hirano, Susono (JP); Kentaro Ichikawa, Sunto-gun (JP); Hiromitsu Urano, Numazu (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 93 days.

(21) Appl. No.: 15/588,952

(22) Filed: May 8, 2017

(65) Prior Publication Data

US 2017/0369077 A1    Dec. 28, 2017

(30) Foreign Application Priority Data

Jun. 22, 2016    (JP) .................................. 2016-123560

(51) Int. Cl.
*B60W 30/182*    (2012.01)
*B60W 10/18*    (2012.01)
(Continued)

(52) U.S. Cl.
CPC .......... *B60W 30/182* (2013.01); *B60W 10/18* (2013.01); *B60W 10/20* (2013.01); *B60W 50/10* (2013.01); *G05D 1/0061* (2013.01); *B60W 10/06* (2013.01); *B60W 50/082* (2013.01); *B60W 2050/007* (2013.01); *B60W 2050/0073* (2013.01); *B60W 2050/0074* (2013.01); *B60W 2520/10* (2013.01); *B60W 2520/105* (2013.01); *B60W 2520/14* (2013.01); *B60W 2540/04* (2013.01); *B60W 2540/10* (2013.01);
(Continued)

(58) Field of Classification Search
CPC .... B60W 30/182; B60W 50/10; B60W 10/20; B60W 10/18; B60W 2050/007; B60W 2050/0073; B60W 2050/0074; G05D 1/0061

See application file for complete search history.

(56) References Cited

U.S. PATENT DOCUMENTS 8,527,199 B1    9/2013    Burnette et al.
9,845,096 B2 *  12/2017   Urano et al. ........ B60W 30/182
(Continued)

FOREIGN PATENT DOCUMENTS

JP    10-309960 A    11/1998
JP    10-309961 A    11/1998
(Continued)

*Primary Examiner* — Dale W Hilgendorf
(74) *Attorney, Agent, or Firm* — Sughrue Mion, PLLC

(57) ABSTRACT

Provided is a vehicle control device capable of switching a driving state of the vehicle, including a switch pedal configured to be provided on a left side of the vehicle rather than an accelerator pedal and a brake pedal of the vehicle; a stepped state detection unit configured to detect a stepped state of the switch pedal; and a driving state switching unit configured to switch the driving state of the vehicle to an automatic driving state, a cooperative driving state and a manual driving state, wherein the driving state switching unit is configured to switch the driving state to the cooperative driving state in a case where stepping of the switch pedal is detected by the stepped state detection unit when the driving state is the automatic driving state.

2 Claims, 13 Drawing Sheets

(51) Int. Cl.
*B60W 10/20* (2006.01)
*B60W 50/10* (2012.01)
*B60W 50/00* (2006.01)
*G05D 1/00* (2006.01)
*H04N 7/18* (2006.01)
*B60W 10/06* (2006.01)
*B60W 50/08* (2012.01)
*G01C 21/26* (2006.01)
*G01S 13/93* (2006.01)
*G01S 17/93* (2006.01)

(52) U.S. Cl.
CPC ..... *B60W 2540/12* (2013.01); *B60W 2540/18* (2013.01); *B60W 2550/10* (2013.01); *B60W 2550/142* (2013.01); *B60W 2550/146* (2013.01); *B60W 2550/402* (2013.01); *G01C 21/26* (2013.01); *G01S 13/931* (2013.01); *G01S 17/936* (2013.01); *H04N 7/183* (2013.01)

(56) References Cited

U.S. PATENT DOCUMENTS

| | | | |
|---|---|---|---|
| 2013/0017233 A1* | 1/2013 | Jalota et al. | ......... G05D 1/0061 |
| 2013/0110343 A1 | 5/2013 | Ichikawa et al. | |
| 2015/0283998 A1 | 10/2015 | Lind et al. | |
| 2016/0170410 A1 | 6/2016 | Ichikawa et al. | |
| 2016/0207538 A1 | 7/2016 | Urano et al. | |
| 2017/0315550 A1* | 11/2017 | Ichikawa et al. | .... G05D 1/0061 |
| 2018/0113454 A1* | 4/2018 | Emura et al. | ....... B60W 30/182 |

FOREIGN PATENT DOCUMENTS

| | | |
|---|---|---|
| JP | 2008-290680 A | 12/2008 |
| JP | 2011-162132 A | 8/2011 |
| JP | 5382218 B2 | 1/2014 |
| JP | 2016-132352 A | 7/2016 |
| WO | 2011/158347 A1 | 12/2011 |

\* cited by examiner

VEHICLE CONTROL DEVICE

CROSS-REFERENCE TO RELATED APPLICATION

This application is based on Japanese Patent Application No. 2016-123560 filed with Japan Patent Office on Jun. 22, 2016, the entire contents of which are hereby incorporated by reference.

TECHNICAL FIELD

The present invention relates to a vehicle control device.

BACKGROUND

There are vehicle control devices capable of switching to the driving state of a vehicle to an automatic driving state, a cooperative driving state, and a manual driving state. In the cooperative driving state, a vehicle is controlled by a driver's driving operation and control of a system. A vehicle control device capable of switching such a driving state is disclosed in, for example, Specification of U.S. Pat. No. 8,527,199.

SUMMARY

Here, when the driving state of a vehicle is switched, it is required to reflect a driver's intention. In the vehicle control device disclosed in Specification of U.S. Pat. No. 8,527,199, no detailed mention is made of switching between each driving state. In addition, a driver also performs a driving operation in the cooperative driving state. Therefore, it is preferable that the vehicle control device can accept the intention of switching to the cooperative driving state so that a case does not occur in which a driver's driving operation is interfered with due to an operation of switching to the cooperative driving state.

Consequently, an object of an aspect of the present invention is to provide a vehicle control device capable of accepting the intention of switching to the cooperative driving state without interfering with a driver's driving operation.

According to an aspect of the present invention, there is provided a vehicle control device capable of switching a driving state of a vehicle that travels using a travel plan generated on the basis of a surrounding environment of the vehicle and a state of the vehicle, or a travel plan generated on the basis of a position of the vehicle, the surrounding environment of the vehicle, the state of the vehicle, and map information, the device including: a switch pedal configured to be provided on a left side of the vehicle rather than an accelerator pedal and a brake pedal of the vehicle, in a placement portion on which a driver who sits on a driving seat of the vehicle places his or her feet; a stepped state detection unit configured to detect a stepped state of the switch pedal; and a driving state switching unit configured to switch the driving state of the vehicle to an automatic driving state where travel of the vehicle is controlled using the travel plan, a cooperative driving state where the vehicle is made to travel in cooperation with a driving operation on the basis of the travel plan and an amount of the driver's driving operation relating to at least one of a steering operation of the vehicle, an operation of the accelerator pedal, and an operation of the brake pedal, and a manual driving state where the amount of the driver's driving operation is reflected in the travel of the vehicle, wherein the driving state switching unit is configured to switch the driving state of the vehicle to the cooperative driving state in a case where stepping of the switch pedal is detected by the stepped state detection unit when the driving state of the vehicle is the automatic driving state.

In this vehicle control device, when the stepping of the switch pedal provided on the left side rather than the accelerator pedal and the brake pedal is detected, the driving state of the vehicle is switched from the automatic driving state to the cooperative driving state. That is, a driver steps the switch pedal using his or her left foot which is not involved in the driving operation (operation of the accelerator pedal, operation of the brake pedal, and operation of the steering) of the vehicle, and thus can deliver the intention of switching the driving state to the vehicle control device. In this manner, the vehicle control device can accept the intention of switching to the cooperative driving state without interfering with the driver's driving operation.

The stepped state detection unit may be configured to detect a stepped amount of or stepping force of the switch pedal as the stepped state, and the driving state switching unit may be configured to change a degree of intervention of the amount of the driver's driving operation in the cooperative driving state, on the basis of the stepped amount of or stepping force of the switch pedal detected by the stepped state detection unit. In this case, the vehicle control device can control the travel of the vehicle by reflecting the degree of intervention which is intended by a driver in the cooperative driving state.

According to an aspect of the present invention, it is possible to accept the intention of switching to the cooperative driving state without interfering with the driver's driving operation.

DETAILED DESCRIPTION

Figure 1:
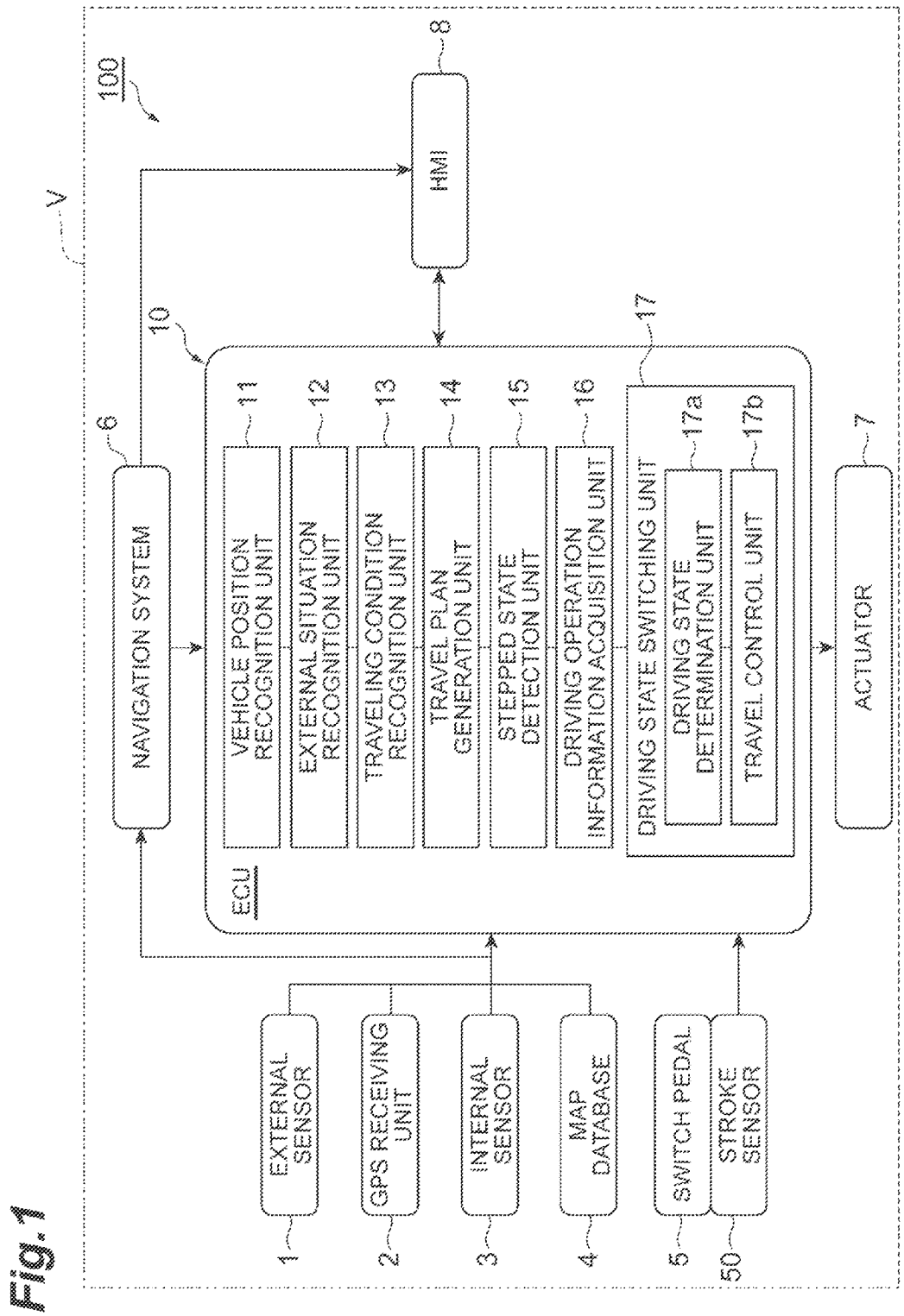
FIG. 1 is a block diagram illustrating a configuration of a vehicle control device according to a first embodiment.

Hereinafter, embodiments of the present invention will be described with reference to the accompanying drawings. Meanwhile, in the description of the drawings, the same components are denoted by the same reference numerals and signs, and thus the description thereof will not be repeated.

First Embodiment

Figure 2:
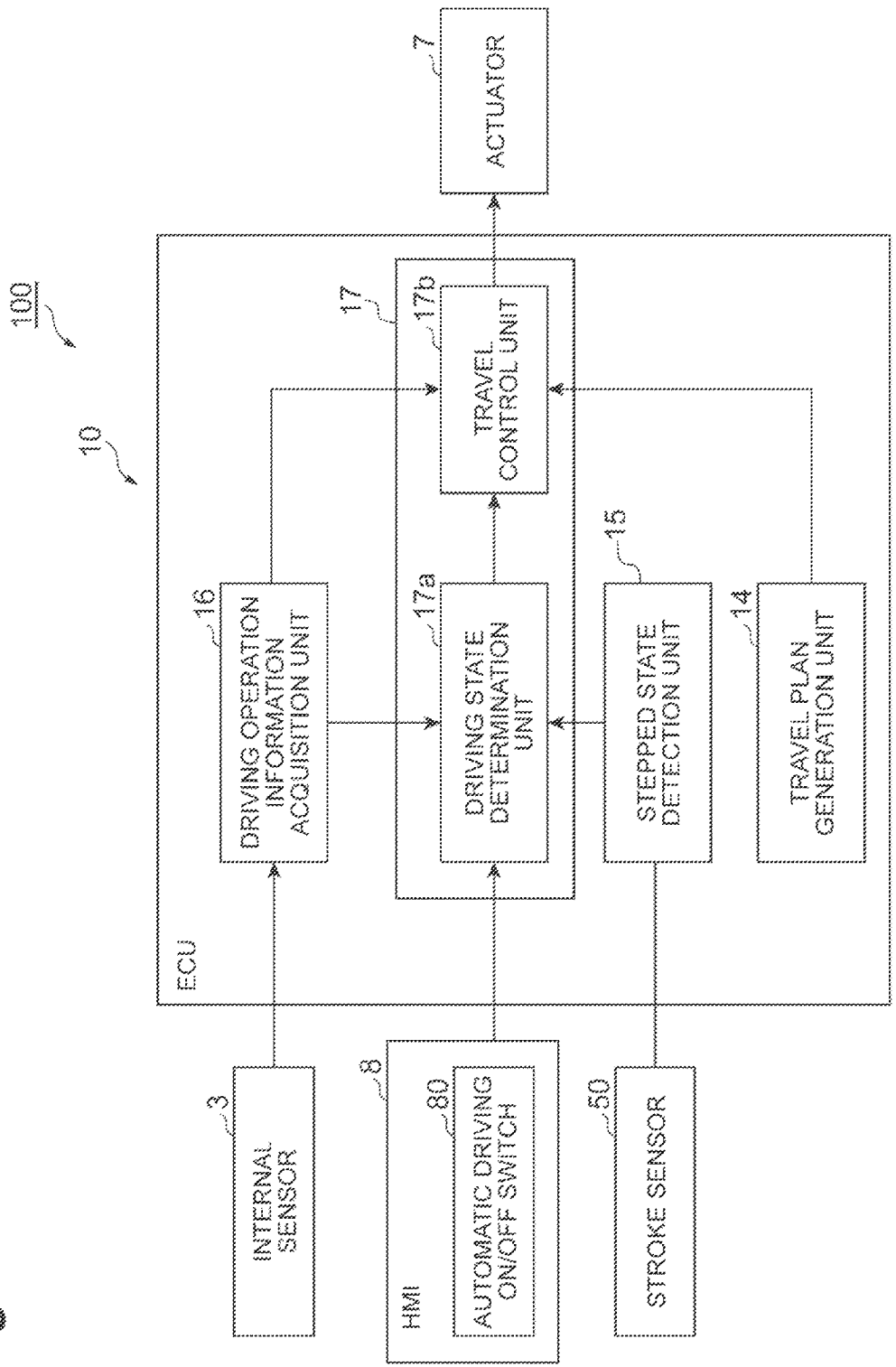
FIG. 2 is a block diagram illustrating an ECU of FIG. 1.

First, a first embodiment will be described. FIG. 1 is a block diagram illustrating a configuration of a vehicle control device 100 according to the first embodiment. FIG. 2 is a block diagram illustrating an electronic control unit (ECU) 10 in the vehicle control device 100 of FIG. 1. As shown in FIG. 1, the vehicle control device 100 is mounted in a vehicle V such as a passenger car. The vehicle control device 100 includes an external sensor 1, a global positioning system (GPS) receiving unit 2, an internal sensor 3, a map database 4, a switch pedal 5, a navigation system 6, an actuator 7, a human machine interface (HMI) 8, and an ECU 10.

The external sensor 1 is a detection device that detects an external situation which is peripheral information of the vehicle V. The external sensor 1 includes at least one of a camera, a radar, and a laser imaging detection and ranging (LIDAR).

The camera is an imaging device that images the external situation of the vehicle V. The camera is provided on the reverse side of the windshield of the vehicle V. The camera transmits imaging information relating to the external situation of the vehicle V to the ECU 10. The camera may be a monocular camera, and may be a stereo camera. The stereo camera includes two imaging units which are disposed so as to reproduce a binocular parallax. Imaging information of the stereo camera also includes depth-direction information.

The radar detects an object outside of the vehicle V using radio waves. The radio waves are, for example, millimeter waves. The radar transmits radio waves to the periphery of the vehicle V and receives radio waves reflected from an object, to thereby detect the object. The radar can output, for example, a distance or a direction to the object as object information. The radar outputs the detected object information to the ECU 10.

The LIDAR detects an object outside of the vehicle V using light. The LIDAR transmits light to the periphery of the vehicle V and receives light reflected from an object, to thereby measure a distance to a reflection point and detect the object. The LIDAR can output, for example, a distance or a direction to the object as object information. The LIDAR outputs the detected object information to the ECU 10. Meanwhile, the camera, the LIDAR and the radar are not necessarily required to be provided redundantly.

The GPS receiving unit 2 receives a signal from three or more GPS satellites, and acquires location information indicating the position of the vehicle V. The location information includes latitude and longitude. The GPS receiving unit 2 outputs the measured position information of the vehicle V to the ECU 10. Meanwhile, other means present in the vehicle V which are capable of specifying the latitude and longitude may be used instead of the GPS receiving unit 2.

The internal sensor 3 is a detector that detects information according to the traveling condition of the vehicle V, and information according to a driver's driving operation of the vehicle V. The internal sensor 3 includes at least one of a speed sensor, an acceleration sensor, and a yaw rate sensor in order to detect information according to the traveling condition of the vehicle V. In addition, the internal sensor 3 includes at least one of an accelerator pedal sensor, a brake pedal sensor, and a steering sensor in order to detect driving operation information.

The speed sensor is a detector that detects the speed of the vehicle V. As the speed sensor, a wheel speed sensor, provided to the wheel of the vehicle V or a drive shaft and the like rotating integrally with the wheel, which detects the rotational speed of the wheel may be used. The speed sensor outputs speed information (wheel speed information) including the speed of the vehicle V to the ECU 10.

The acceleration sensor is a detector that detects the acceleration of the vehicle V. The acceleration sensor includes, a front-back acceleration sensor that detects the acceleration of the vehicle V in a front-back direction and a lateral acceleration sensor that detects the lateral acceleration of the vehicle V. The acceleration sensor outputs acceleration information including the acceleration of the vehicle V to the ECU 10.

The yaw rate sensor is a detector that detects a yaw rate (rotational angular velocity) around the vertical axis of the centroid of the vehicle V. A gyro sensor can be used as the yaw rate sensor. The yaw rate sensor outputs yaw rate information including the yaw rate of the vehicle V to the ECU 10.

The accelerator pedal sensor is a detector that detects the stepped amount of an accelerator pedal. The stepped amount of the accelerator pedal is the position (pedal position) of the accelerator pedal based on a predetermined position. The predetermined position may be a fixed position, and may be a position changed by a predetermined parameter. The accelerator pedal sensor is provided to the shaft portion of the accelerator pedal of the vehicle V. The accelerator pedal sensor outputs operation information according to the stepped amount of the accelerator pedal to the ECU 10. Meanwhile, when the pedal position of the accelerator pedal moves in accordance with a control target value of the accelerator pedal included in a travel plan described later, the accelerator pedal sensor detects a pedal position in which both an accelerator pedal operation and a system control input are reflected. On the other hand, when the pedal position of the accelerator pedal does not move in accordance with the control target value of the accelerator pedal included in the travel plan described later, the accelerator pedal sensor detects a pedal position according to the accelerator pedal operation.

The brake pedal sensor is a detector that detects the stepped amount of a brake pedal. The stepped amount of the brake pedal is the position (pedal position) of the brake pedal based on a predetermined position. The predetermined position may be a fixed position, and may be a position changed by a predetermined parameter. The brake pedal sensor is provided to the shaft portion of the brake pedal. The brake pedal sensor may detect the operation force of the brake pedal (such as the stepping force of the brake pedal or the pressure of a master cylinder). The brake pedal sensor outputs operation information according to the stepped amount or operation force of the brake pedal to the ECU 10. Meanwhile, when the pedal position of the brake pedal moves in accordance with a control target value of the brake pedal included in the travel plan described later, the brake pedal sensor detects a pedal position in which both the brake pedal operation and the system control input are reflected.

On the other hand, when the pedal position of the brake pedal does not move in accordance with a control target value of the brake pedal included in the travel plan described later, the brake pedal sensor detects a pedal position according to the brake pedal operation.

The steering sensor is a detector that detects the rotational state of steering. The detection value of the rotational state is a steering torque or a rudder angle. The steering sensor is provided to the steering shaft of the vehicle V. The steering sensor outputs information including the steering torque or the rudder angle of steering to the ECU 10. Meanwhile, when steering rotates in accordance with a control target value of the steering included in the travel plan described later, the steering sensor detects a steering torque or a rudder angle in which both a steering operation and the system control input are reflected. On the other hand, when steering does not rotate in accordance with the control target value of the steering included in the travel plan described later, the steering sensor detects a steering torque or a rudder angle according to the steering operation.

The map database 4 is a database that stores map information. The map database 4 is formed within a hard disk drive (HDD) mounted in the vehicle V. The map information includes position information of a road, information (such as, for example, a curve, the type of straight-line portion, or the curvature of the curve) of a road shape, position information of an intersection point and a branching point, position information of a building, and the like. Meanwhile, the map database 4 may be stored in a computer of a facility such as an information processing center capable of communicating with the vehicle V.

The switch pedal 5 is a pedal which is stepped by a driver of the vehicle V. The switch pedal 5 is provided to a placement portion on which a driver who sits on a driving seat places his or her feet, in the interior of the vehicle V. In addition, the switch pedal 5 is provided on the left side of the vehicle V rather than the accelerator pedal and the brake pedal of the vehicle V, in the placement portion. That is, the switch pedal 5 is provided at a position capable of being stepped by a driver using his or her left foot.

Figure 3B:
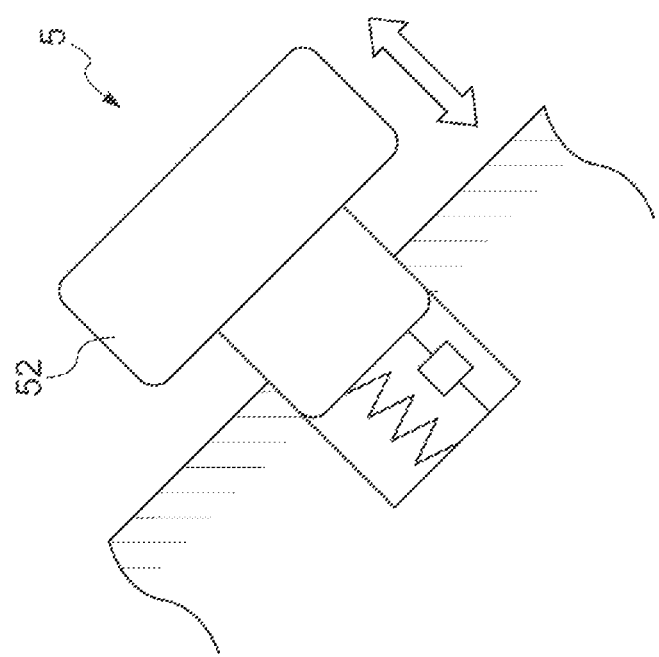
FIGS. 3A and 3B are diagrams illustrating a configuration of a switch pedal.
Figure 3A:
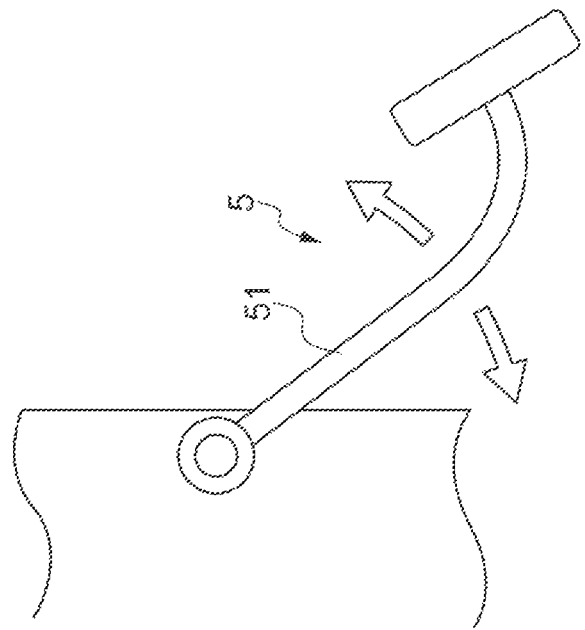

FIGS. 3A and 3B are diagrams illustrating a configuration of the switch pedal. As shown in FIG. 3A, the switch pedal 5 may be a pedal having an arm 51 of which the base end side is rotatably fixed to a pedal support, and which rotates by the apical end side thereof being stepped by a driver. In addition, as shown in FIG. 3B, the switch pedal 5 may be a pedal having a button portion 52 which is pressed down by being stepped by a driver.

In addition, the switch pedal 5 is provided with a stroke sensor 50 (see FIG. 2) that detects the stepped state of the switch pedal 5. This stroke sensor 50 can detect a stepped amount when the switch pedal 5 is stepped by a driver, in addition to the detection of whether the switch pedal 5 is stepped. When the switch pedal 5 is a pedal shown in FIG. 3A, the stroke sensor 50 outputs a signal according to the amount of rotation (amount of stroke) of the arm 51, as the stepped amount of the switch pedal 5, to the ECU 10. In addition, when the switch pedal 5 is a pedal shown in FIG. 3B, the stroke sensor 50 outputs a signal according to the pressed amount (amount of stroke) of the button portion 52, as the stepped amount of the switch pedal 5, to the ECU 10.

The navigation system 6 is a device that performs guidance to a destination, set on a map by a driver of the vehicle V, for the driver of the vehicle V. The navigation system 6 calculates a travel route of the vehicle V on the basis of the position information of the vehicle V measured by the GPS receiving unit 2 and the map information of the map database 4. The route may be, for example, a route in which the travel lane of the vehicle V is specified in the intervals of a plurality of lanes. The navigation system 6 calculates a target route from the position of the vehicle V to a destination, and notifies a driver of the target route through the indication of a display and the sound output of a speaker. The navigation system 6 outputs information of the target route of the vehicle V to the ECU 10. Meanwhile, the navigation system 6 may use information which is stored in a computer of a facility such as an information processing center capable of communicating with the vehicle V. Alternatively, a portion of processing performed by the navigation system 6 may be performed by the computer of a facility.

The actuator 7 is a device that executes travel control of the vehicle. The actuator 7 includes at least an engine actuator, a brake actuator, and a steering actuator. The engine actuator controls the driving force of the vehicle V by changing the amount of air supplied to an engine (changing, for example, throttle opening) in accordance with a control signal from the ECU 10. Meanwhile, when the vehicle V is a hybrid car or an electric automobile, the engine actuator controls the driving force of a motor as a motive power source.

The brake actuator controls a braking system in accordance with a control signal from the ECU 10, and controls a braking force which is given to the wheel of the vehicle V. As the braking system, a hydraulic braking system can be used. Meanwhile, when the vehicle V includes a regenerative braking system, the brake actuator may control both the hydraulic braking system and the regenerative braking system. The steering actuator controls the driving of an assist motor that controls a steering torque in an electromotive power steering system, in accordance with the control signal from the ECU 10. Thereby, the steering actuator controls the steering torque of the vehicle V.

The HMI 8 is an interface for outputting and inputting information between an occupant (including a driver) of the vehicle V and the vehicle control device 100. The HMI 8 includes, for example, a display panel for displaying image information to an occupant, a speaker for outputting a sound, an operation button or a touch panel for an occupant to perform an input operation, and the like. As shown in FIG. 2, the HMI 8 includes an automatic driving ON/OFF switch 80 which is an input unit that inputs a driver's request operation of automatic driving start. The automatic driving ON/OFF switch 80 may be configured such that a driver can input a request operation according to an automatic driving end. When a request operation according to the automatic driving start or end is performed by a driver, the automatic driving ON/OFF switch 80 outputs information indicating the automatic driving start or the automatic driving end to the ECU 10. Meanwhile, the input unit is not limited to a switch, and any unit may be used insofar as the unit can input information capable of determining a driver's intention of the automatic driving start or end. For example, the input unit may be an automatic driving start button, an automatic driving end button or the like, and may be an object of switch or a button which is displayed on a screen capable of being operated by a driver. The HMI 8 may output information to an occupant using a portable information terminal which is wirelessly connected, and may receive an input operation by an occupant using a portable information terminal.

The ECU 10 shown in FIGS. 1 and 2 controls the automatic travel of the vehicle V. The ECU 10 is an electronic control unit including a central processing unit (CPU), a read only memory (ROM), a random access memory (RAM), and the like. In the ECU 10, a program stored in the ROM is loaded to the RAM, and is executed by the CPU, to thereby execute various types of control. The ECU 10 may be constituted by a plurality of electronic control units.

As shown in FIGS. 1 and. 2, the ECU 10 includes a vehicle position recognition unit 11, an external situation recognition unit 12, a traveling condition recognition unit 13, a travel plan generation unit 14, a stepped state detection unit 15, a driving operation information acquisition unit 16, and a driving state switching unit 17.

The vehicle position recognition unit 11 recognizes the position of the vehicle V on a map (hereinafter, referred to as the "vehicle position"), on the basis of the position information of the vehicle V received in the GPS receiving unit 2 and the map information of the map database 4. Meanwhile, the vehicle position recognition unit 11 may acquire and recognize a vehicle position used in the navigation system 6 from the navigation system 6. When the vehicle position of the vehicle V can be measured by a sensor installed outside such as on a road, the vehicle position recognition unit 11 may acquire the vehicle position from this sensor through communication.

The external situation recognition unit 12 recognizes the external situation (surrounding environment) of the vehicle V on the basis of a detection result of the external sensor 1. The detection result includes, for example, imaging information of a camera, obstacle information of a radar sensor, or the like. The external situation may include, for example, the position of a white line of a travel lane or the position and road width of the lane center with respect to the vehicle V, and the shape of a road. The shape of a road may be, for example, the curvature of a travel lane, the inclination change of a road surface effective in the visibility of estimation of the external sensor 1, undulation, or the like. In addition, the external situation may be the situation of objects such as an obstacle in the vicinity of the vehicle V. The situation of an object may include, for example, information for distinguishing between a fixed obstacle and a moving obstacle, the position of an obstacle with respect to the vehicle V, the moving direction of an obstacle with respect to the vehicle V, the relative speed of an obstacle with respect to the vehicle V, and the like.

The traveling condition recognition unit 13 recognizes the traveling condition of the vehicle V (state of the vehicle) on the basis of the detection result of the internal sensor 3. The detection result of the internal sensor 3 includes speed information of the speed sensor, acceleration information of the acceleration sensor, yaw rate information of the yaw rate sensor, or the like. Information indicating the traveling condition of the vehicle V includes a vehicle speed, acceleration, or a yaw rate.

The travel plan generation unit 14 generates a travel plan which is used when the travel of the vehicle V is controlled, and outputs the generated travel plan to the driving state switching unit 17. In order to generate the travel plan, the travel plan generation unit 14 generates a course of the vehicle V on the basis of a target route calculated by the navigation system 6, a vehicle position recognized by the vehicle position recognition unit 11, the traveling condition of the vehicle V recognized by the traveling condition recognition unit 13, and the external situation of the vehicle V recognized by the external situation recognition unit 12. The course is a trajectory along which the vehicle V on the target route. The travel plan generation unit 14 generates a course so that the vehicle V travels in a state of satisfying a criterion such as safety, legal compliance, or travel efficiency, on the target route. Further, the travel plan generation unit 14 generates a course of the vehicle V so as to avoid contact with an object, on the basis of the situation of an object in the vicinity of the vehicle V.

Meanwhile, the target route described in the present specification also includes a travel route which is automatically generated on the basis of the external situation or the map information when the setting of a destination is not explicitly performed from a driver, like a travel route along a road in a "driving assistance device" disclosed in Japanese Patent No. 5382218 (WO2011/158347) or an "automatic driving device" disclosed in Japanese Unexamined Patent Publication No. 2011-162132.

The travel plan generation unit 14 generates a travel plan according to the generated course. That is, the travel plan generation unit 14 generates a travel plan along the target route which is set in advance on a map, on the basis of at least the position of the vehicle V, the external situation which is peripheral information of the vehicle V, the traveling condition of the vehicle V, and the map information of the map database 4. The travel plan generation unit 14 generates a travel plan including sets consisting of two elements of a target position p in a coordinate system having the course of the vehicle V fixed to the vehicle V and a target speed v at the target position, that is, a plurality of configuration coordinates (p, v). Each of a plurality of target positions p has at least the position of an x coordinate or a y coordinate in a coordinate system fixed to the vehicle V, or information equivalent thereto. Meanwhile, the travel plan may include information indicating the behavior of the vehicle V, and is not limited to a plan including configuration coordinates. The travel plan may include a target time t, as the information indicating the behavior of the vehicle V, instead of the target speed v, and may further include information relating to the orientation of the vehicle V at the target time t and the point in time.

Generally, the travel plan is enough with data indicating a plan approximately from the current time to the future in a few seconds. However, data indicating a plan in several tens of seconds may be required depending on a situation such as a right turn at an intersection point or passing of the vehicle V. On the assumption of such a case, the number of configuration coordinates of the travel plan may be made variable, and a distance between the configuration coordinates may also be made variable. Further, a curve linking configuration coordinates adjacent to each other may be approximated using a spline function or the like, and parameters of the approximated curve may be set to a travel plan. A method of generating a travel plan may be a method capable of indicating the behavior of the vehicle V, and any known method can be adopted.

The travel plan includes, for example, a target control value when the vehicle control device 100 controls a vehicle. For example, the travel plan may be set to data indicating a transition such as the speed, the acceleration and deceleration, and the steering torque of steering of the vehicle V when the vehicle V travels on a course along the target route. That is, the travel plan may include the speed pattern, the acceleration and deceleration pattern, and the steering torque pattern of the vehicle V. Alternatively, the travel plan may be set to data indicating transitions of the control target value of the accelerator pedal and the control target value of the brake pedal, instead of the speed pattern and the acceleration and deceleration pattern of the vehicle V. The travel plan generation unit 14 may generate a travel plan so that a travel time (time taken for the vehicle V to reach a destination) becomes shortest.

The speed pattern refers to data constituted by target speeds which are set in association with a time for each of target control positions which are set at a predetermined interval (for example, 1 m) on a course. The acceleration and deceleration pattern refers to data constituted by target acceleration and deceleration which are set in association with a time for each of target control positions which are set at a predetermined interval (for example, 1 m) on a course. The steering pattern refers to data constituted by target steering torques which are set in association with a time for each of target control positions which are set at a predetermined interval (for example, 1 m) on a course. The data indicating transitions the control target value of the accelerator pedal and the control target value of the brake pedal refers to data constituted by pedal positions which are set in association with a time for each of target control positions which are set at a predetermined interval (for example, 1 m) on a course.

The stepped state detection unit 15 detects the stepped state of the switch pedal 5 on the basis of a detection result of the stroke sensor 50. Specifically, the stepped state detection unit 15 detects whether the switch pedal 5 is stepped, and the stepped amount of the switch pedal 5. The stepped state detection unit 15 outputs the detected stepped state of the switch pedal 5 to the driving state switching unit 17.

Figure 4:
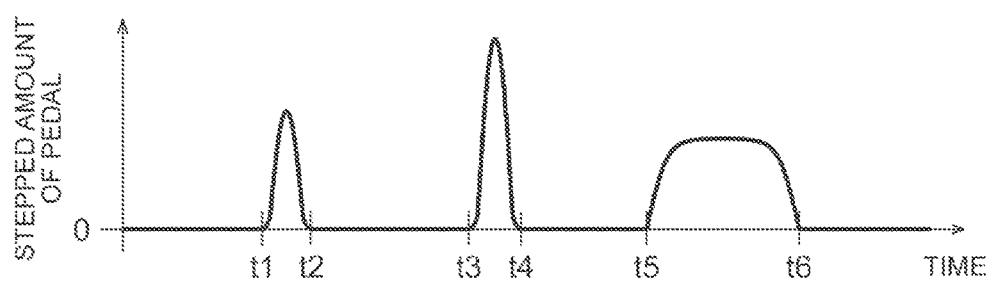
FIG. 4 is a diagram illustrating an example of a detection result of the stepped state of the switch pedal in a stepped state detection unit.

Here, FIG. 4 illustrates an example of detection results of the stepped state of the switch pedal 5 in the stepped state detection unit 15. In the example shown in FIG. 4, the stepping of the switch pedal 5 by a driver is started at time t1, and the stepping of the switch pedal 5 is terminated at time t2. That is, the switch pedal 5 is stepped by a driver between time t1 and time t2. In this case, a signal according to the stepped amount of the switch pedal 5 is output by the stroke sensor 50. Similarly, the stepping of the switch pedal 5 by a driver is started at time t3, and the stepping of the switch pedal 5 is terminated at time t4. That is, the switch pedal 5 is stepped by a driver between time t3 and time t4. In addition, the stepping of the switch pedal 5 by a driver is started at time t5, and the stepping of the switch pedal 5 is terminated at time t6. That is, the switch pedal 5 is stepped by a driver between time t5 and time t6.

The driving operation information acquisition unit 16 acquires driving operation information which is information according to a driver's driving operation, on the basis of the detection result of the internal sensor 3. For example, the driving operation information acquisition unit 16 acquires the amounts of the steering operation, accelerator operation, and brake operation of the vehicle V, as the driving operation information.

The steering operation is, for example, a rotating operation of a steering wheel performed by a driver. That is, the driving operation information relating to the steering operation includes the amount of operation (steering torque or rudder angle) of the steering wheel. When the steering of the vehicle V rotates in accordance with the control target value (target steering torque or target steering angle) of the steering included in the travel plan, the driving operation information acquisition unit 16 acquires a difference between the rotational state detection value of the steering of the vehicle V detected by the steering sensor and the control target value of the steering included in the travel plan generated by the travel plan generation unit 14, as the amount of the steering operation. Meanwhile, since a deviation between the control target value and the rotational state detection value may be able to be detected, the above difference may be, for example, a difference between the differential value of the rotational state detection value and the differential value of the control target value. On the other hand, when the steering does not rotate in accordance with the control target value of the steering included in the travel plan, the driving operation information acquisition unit 16 acquires the rotational state detection value of the steering of the vehicle V detected by the steering sensor, as the amount of the steering operation. In any case, the driving operation information acquisition unit 16 may acquire the absolute value of a driver's amount of operation.

The accelerator operation is, for example, a stepping operation of the accelerator pedal performed by a driver. That is, the driving operation information relating to the accelerator operation includes information according to the amount of operation (stepped amount) of the accelerator pedal. The brake operation is, for example, a stepping operation of the brake pedal performed by a driver. That is, the driving operation information relating to the brake pedal operation includes information according to the amount of operation (stepped amount) of the brake pedal. Meanwhile, regarding the accelerator operation and the brake operation, similarly to the above-described steering operation, when the pedal position is changed in accordance with a system control value, a difference between the detection value and the control target value is calculated, and the absolute value of a driver's amount of operation is acquired. That is, when the pedal position of the accelerator pedal of the vehicle V moves in accordance with the control target value of the accelerator pedal included in the travel plan, the driving operation information acquisition unit 16 acquires a difference between the pedal position detection value of the accelerator pedal of the vehicle V and the control target value of the accelerator pedal included in the travel plan, as the amount of the accelerator operation. The control target value of the accelerator pedal may be derived from the speed, acceleration and deceleration, or the like of the vehicle V included in the travel plan. Similarly, when the pedal position of the brake pedal of the vehicle V moves in accordance with the control target value of the brake pedal included in the travel plan, the driving operation information acquisition unit 16 acquires a difference between the pedal position detection value of the brake pedal of the vehicle V and the control target value of the brake pedal included in the travel plan, as the amount of the brake operation. The control target value of the brake pedal may be derived from the speed, acceleration and deceleration, or the like of the vehicle V included in the travel plan. The driving operation information acquisition unit 16 outputs the driving operation information to the driving state switching unit 17.

The driving state switching unit 17 switches the driving state of the vehicle V to any of an automatic driving state, a cooperative driving state, and a manual driving state. Here, the automatic driving state refers to a state where the travel of the vehicle V is controlled using the travel plan. That is, the automatic driving state refers to a state where a driver does not perform a driving operation, and the travel of the vehicle V is realized by only control of the vehicle control device 100 in a state where a driver's intervention is not performed. The cooperative driving state refers to a driving state where the vehicle V is made to travel in cooperation with a driver's driving operation, on the basis of the travel plan and the amount of the driver's driving operation. That is, the cooperative driving state is a state where the travel of the vehicle V is realized on the basis of the amount of the driver's driving operation in a state where both the driver and the vehicle control device 100 can be involved in the travel of the vehicle V, and a state where system intervention is possible. The manual driving state refers to a state where the amount of the driver's driving operation is reflected in the travel of the vehicle V. That is, the manual driving state refers to a state where the amount of the driver's driving operation is reflected in the travel of the vehicle V in a state where the system intervention is not possible. Meanwhile, the driver's driving operation herein includes the steering operation, the accelerator operation, and the brake operation.

In addition, in a case where the stepping of the switch pedal 5 is detected by the stepped state detection unit 15 when the driving state of the vehicle V is the automatic driving state, the driving state switching unit 17 switches the driving state of the vehicle V to the cooperative driving state. Further, when the driving state of the vehicle V is switched from the automatic driving state to the cooperative driving state by the stepping of the switch pedal 5 being detected by the stepped state detection unit 15, the driving state switching unit 17 changes the degree of intervention of the amount of the driver's driving operation in the cooperative driving state, on the basis of the stepped amount of the switch pedal 5 detected by the stepped state detection unit 15.

Figure 5:
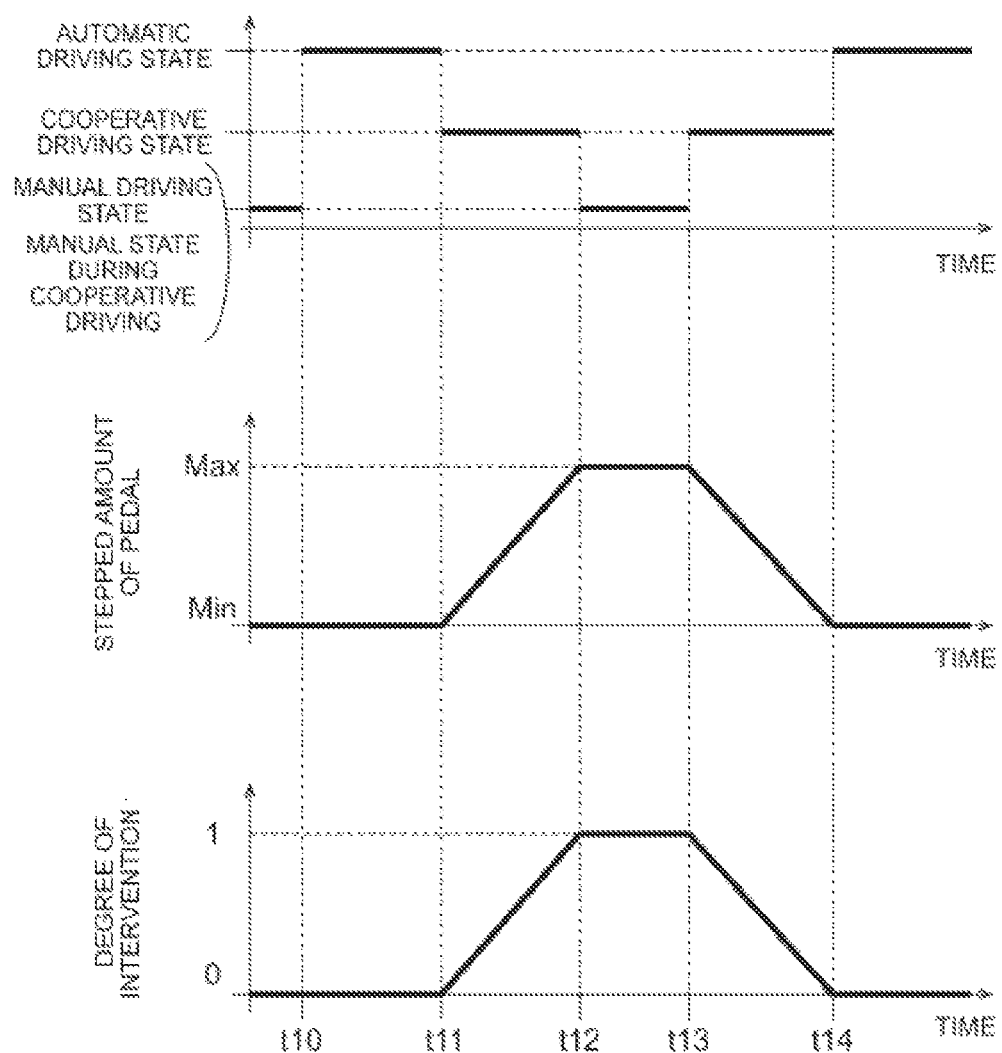
FIG. 5 is a diagram illustrating a relationship between each driving state, the stepped amount of the pedal, and the degree of intervention when driving states are switched.

Specifically, the driving state switching unit 17 includes a driving state determination unit 17a and a travel control unit 17b. The driving state determination unit 17a makes a determination of switching the driving state of the vehicle V from the manual driving state to the automatic driving state, on the basis of a request operation according to the automatic driving start which is input to the automatic driving ON/OFF switch 80. The driving state determination unit 17a makes a determination of switching the driving state of the vehicle V from the automatic driving state to the manual driving state, on the basis of a request operation according to the automatic driving end which is input to the automatic driving ON/OFF switch 80. FIG. 5 is a diagram illustrating a relationship between each driving state, the stepped amount of the pedal, and the degree of intervention when the driving state is switched. In example shown in FIG. 5, the driving state of the vehicle V is switched from the manual driving state to the automatic driving state at time t10.

Meanwhile, when the driving state of the vehicle V is the manual driving state, and the automatic driving control of the vehicle V is in an enabled state in the vehicle control device 100, in addition to the request operation of the automatic driving ON/OFF switch 80, the driving state determination unit 17a may make a determination of automatically switching the driving state of the vehicle V from the manual driving state to the automatic driving state. Examples of the wording "the automatic driving control of the vehicle V is in an enabled state in the vehicle control device 100" include a state where the number of obstacles in the vicinity of the vehicle V is a number equal to or less than a threshold which is set in advance, a state where a road on which the vehicle V is traveling straight, a state where the position of the vehicle V can be detected with a good degree of accuracy by the vehicle position recognition unit 11, or the like. In addition, when the automatic driving control of the vehicle V is in an enabled state in the vehicle control device 100, and a request operation according to automatic driving is input to the automatic driving ON/OFF switch 80 by a driver, the driving state determination unit 17a may make a determination of switching the driving state of the vehicle V from manual driving state to the automatic driving state.

In a case where the stepping of the switch pedal 5 is detected by the stepped state detection unit 15 when the driving state of the vehicle V is the automatic driving state (when the automatic driving state is determined) (time t11 in FIG. 5), the driving state determination unit 17a makes a determination of switching the driving state of the vehicle V from the automatic driving state to the cooperative driving state. While the stepping of the switch pedal 5 is detected by the stepped state detection unit 15 (between time t11 and time t14 in FIG. 5), the driving state determination unit 17a maintains a state where the cooperative driving state is determined as the driving state of the vehicle V. While it is detected by the stepped state detection unit 15 that the stepping of the switch pedal 5 is released (time t14 in FIG. 5), the driving state determination unit 17a makes a determination of switching the driving state of the vehicle V from the cooperative driving state to the automatic driving state.

When the stepping of the switch pedal 5 is detected by the stepped state detection unit 15, the driving state determination unit 17a calculates the degree of intervention of the amount of the driver's driving operation in the cooperative driving state, in accordance with the stepped amount of the switch pedal 5. The driving state determination unit 17a calculates the degree of intervention so that the value of the degree of intervention becomes large as the stepped amount of the switch pedal 5 becomes larger. When the switch pedal 5 is fully stepped (the stepped amount is Max), the driving state determination unit 17a maximizes the degree of intervention of the amount of the driver's driving operation. In example shown in FIG. 5, the driving state determination unit 17a calculates the degree of intervention between larger than 0 and equal to less than 1, in accordance with the stepped amount of the switch pedal 5.

Here, as described later, when the travel of the vehicle V is controlled so as to be switched to the cooperative driving state by the switch pedal 5 being stepped during the automatic driving state, the travel control unit 17b changes the degree of intervention of the amount of the driver's driving operation, in accordance with the degree of intervention calculated by the driving state determination unit 17a. In this case, the travel of the vehicle V may be controlled in a state where only the driver's driving operation is temporarily reflected, in spite of the cooperative driving state, depending on the degree of intervention. In this manner, in a case of the cooperative driving state, a state where only the driver's driving operation is temporarily is reflected and the travel of the vehicle is controlled is referred to as a "manual state during cooperative driving". That is, the manual state during cooperative driving is one state in the cooperative driving state. In the example shown in FIG. 5, a period between time t12 and time t13 is set to be in the manual state during cooperative driving.

When cooperative driving state is determined as the driving state of the vehicle V, the driving state determination unit 17a makes a determination (determination of override) of switching the driving state of the vehicle V from the cooperative driving state to the manual driving state, on the basis of the driving operation information acquired by the driving operation information acquisition unit 16. Specifically, when the amount of the driver's driving operation exceeds a predetermined operation threshold, the driving state determination unit 17a makes a determination of switching the driving state of the vehicle V from the cooperative driving state to the manual driving state. For example, in at least any of a case where the amount of operation of the steering wheel exceeds the predetermined operation threshold, a case where the amount of operation of the accelerator pedal exceeds the predetermined operation threshold, and a case where the amount of operation of the brake pedal exceeds the predetermined operation threshold, the driving state determination unit 17*a* makes a determination of switching the driving state of the vehicle V from the cooperative driving state to the manual driving state. Further, the driving state determination unit 17*a* may change the predetermined operation threshold compared with the amount of the driver's driving operation, on the basis of the stepped amount of the switch pedal 5 detected by the stepped state detection unit 15. For example, the driving state determination unit 17*a* may increase the predetermined operation threshold as the stepped amount of the switch pedal 5 becomes larger. However, it is not necessarily required for the driving state determination unit 17*a* to make a determination of switching the driving state from the cooperative driving state to the manual driving state on the basis of the driving operation information. That is, even when there is a large driving operation performed by a driver, the driving state determination unit 17*a* may maintain the cooperative driving state as the driving state of the vehicle V.

When the automatic driving state is determined as the driving state of the vehicle V, the driving state determination unit 17*a* makes a determination (determination of override) of switching the driving state of the vehicle V from the automatic driving state to the manual driving state, on the basis of the driving operation information acquired by the driving operation information acquisition unit 16. Specifically, when the amount of the driver's driving operation exceeds the predetermined operation threshold, the driving state determination unit 17*a* makes a determination of switching the driving state of the vehicle V from the automatic driving state to the manual driving state.

The travel control unit 17*b* makes the vehicle V travel in the driving state determined by the driving state determination unit 17*a*. When the driving state of the vehicle V is the automatic driving state, the travel control unit 17*b* outputs a control signal to the actuator 7 on the basis of the travel plan generated by the travel plan generation unit 14, and controls the travel of the vehicle V so as to be switched to the automatic driving state. When the driving state of the vehicle V is the cooperative driving state, the travel control unit 17*b* outputs a control signal to the actuator 7 on the basis of the travel plan generated by the travel plan generation unit 14 and the driver's driving operation acquired by the driving operation information acquisition unit 16, and makes the vehicle V travel in cooperation with the driver's driving operation. When the driving state of the vehicle V is the manual driving state, the travel control unit 17*b* outputs a control signal, based on the driver's driving operation acquired by the driving operation information acquisition unit 16, to the actuator 7, and reflects the driver's driving operation in the travel of the vehicle V. Thereby, the travel control unit 17*b* realizes three states of the automatic driving state, the cooperative driving state, and the manual driving state.

In addition, when the driving state determined by the driving state determination unit 17*a* is the cooperative driving state, the travel control unit 17*b* changes the degree of intervention of the amount of the driver's driving operation on the basis of the degree of intervention calculated by the driving state determination unit 17*a*. Thereby, it is possible to change the degree of system intervention in the cooperative driving state. Specifically, the travel control unit 17*b* controls the travel of the vehicle V so as to be switched to the cooperative driving state, on the basis of a value obtained by performing weighting using the degree of intervention with respect to the control target value based on the amount of the driver's driving operation and the travel plan.

As an example, in a case where the control target is a steering torque of the steering wheel, when a steering torque detected by the driving operation information acquisition unit 16 is set to $T_D$, and a system input torque obtained on the basis of the travel plan is set to $T_S$, a target steering torque $T_R$ is calculated on the basis of the following Expression (1).

$$T_R = w \times T_D + (1-w) \times T_S \qquad (1)$$

Here, w is a weight coefficient, and the degree of intervention p calculated by the driving state determination unit 17*a* is used (that is, w=p). Thereby, when the degree of intervention p is small, the target steering torque $T_R$ is greatly influenced by the system input torque $T_S$. As the degree of intervention p becomes larger, the target steering torque $T_R$ is less influenced by the system input torque $T_S$, and is more influenced by the steering torque $T_D$ operated by a driver. When the degree of intervention p is maximum (when p=1), the target steering torque $T_R$ is influenced only by the steering torque $T_D$ operated by a driver, and becomes equal to the steering torque $T_D$.

Meanwhile, the above description has been given of an example in which when the control target is a steering torque of the steering wheel, the degree of intervention of the driver's driving operation is changed on the basis of the degree of intervention p, the degree of intervention of the driver's driving operation can be changed on the basis of the degree of intervention p, similarly with respect to other control target values. Examples of the control target values to be used may include various control target values such as the steering angle (target steering angle) of the steering wheel, the stepped amount (target stepped amount) of the brake pedal, and the target amount of deceleration.

In the example shown in FIG. 5, the driving state of the vehicle V is the cooperative driving state between time t11 and time t12, but the travel of the vehicle V is controlled so that the driver's driving operation is greatly reflected with an increase in the stepped amount of the switch pedal 5. When the switch pedal 5 is fully stepped and the degree of intervention p is set to 1 (time t12), the travel of the vehicle V is controlled in the manual state during cooperative driving which is a state where only the driver's driving operation is temporarily reflected (between time t12 and time t13). When the stepping of the switch pedal 5 is gradually released between time t13 and time t14, the travel of the vehicle V is controlled so that system intervention based on the travel plan is greatly reflected, with a decrease in the stepped amount of the switch pedal 5.

Figure 6:
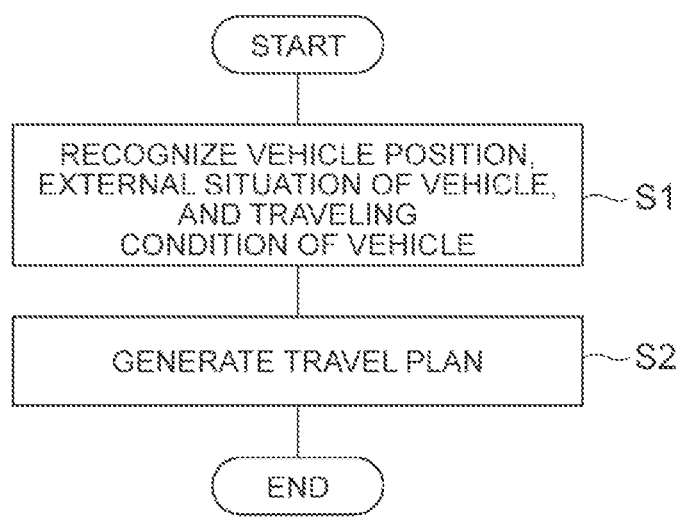
FIG. 6 is a flow diagram illustrating an example of a travel plan generation process.

Next, a process in which the vehicle control device 100 generates a travel plan will be described. FIG. 6 is a flow diagram illustrating an example of a travel plan generation process. A control process shown in FIG. 6 is repeatedly executed for each predetermined time, for example, until the request operation of the automatic driving start is input to the automatic driving ON/OFF switch 80, and then the request operation of the automatic driving end is performed. In addition, in a case of automatic switching to the automatic driving state when the automatic driving control of the vehicle V is in an enabled state in the vehicle control device 100, the vehicle control device 100 may start the process shown in FIG. 6 when the automatic driving control is in an enabled state, and repeatedly execute this process for each predetermined time until the automatic driving control is in a disabled state, or until the request operation of the automatic driving end is input to the automatic driving ON/OFF switch 80.

As shown in FIG. 6, first, the vehicle position recognition unit 11 recognizes a vehicle position from the position information of the vehicle V received in the GPS receiving unit 2 and the map information of the map database 4. The external situation recognition unit 12 recognizes the external situation of the vehicle V from the detection result of the external sensor 1. The traveling condition recognition unit 13 recognizes the traveling condition of the vehicle V from the detection result of the internal sensor 3 (S1). The travel plan generation unit 14 then generates a travel plan of the vehicle V from the target route of the navigation system 6, the vehicle position, the external situation of the vehicle V, and the traveling condition of the vehicle V (S2). In this manner, the travel plan of the vehicle V is generated.

Figure 7:
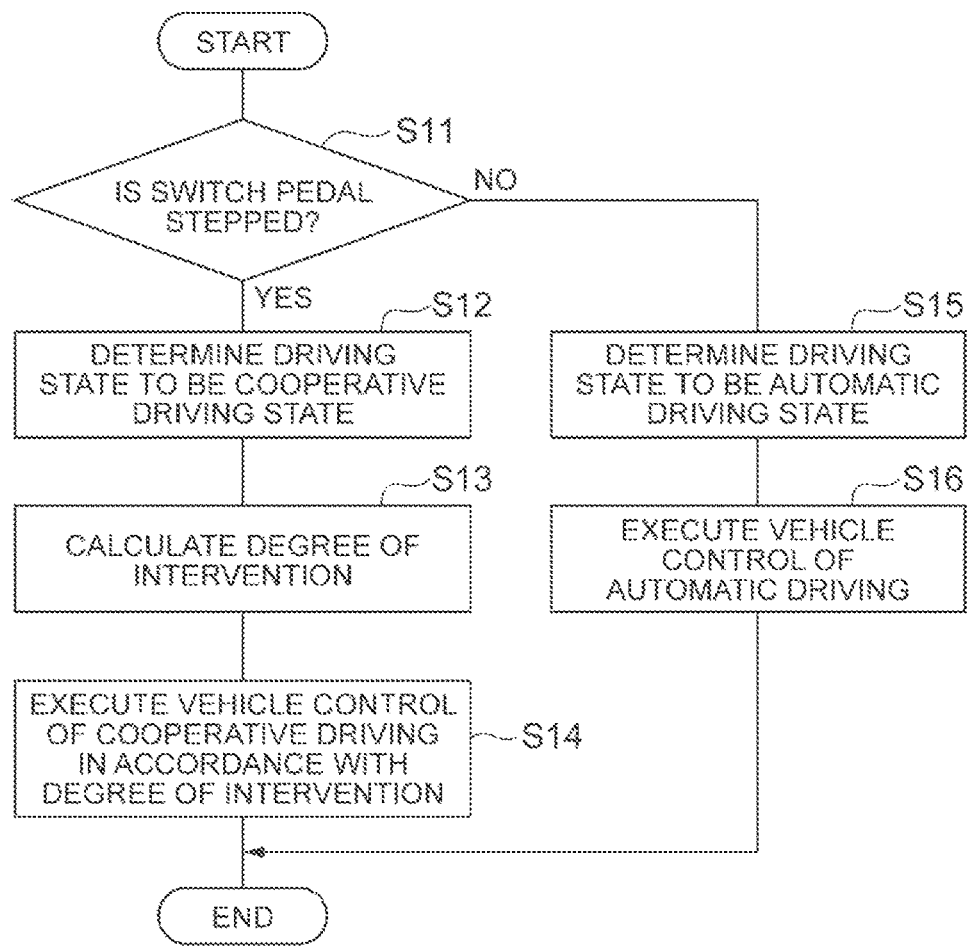
FIG. 7 is a flow diagram illustrating an example of a process of switching the driving state of a vehicle from an automatic driving state to a cooperative driving state.

Next, a description will be given of a process of switching to the cooperative driving state according to the stepping of the switch pedal 5 by a driver when the driving state of the vehicle V is the automatic driving state. FIG. 7 is a flow diagram illustrating an example of a process of switching the driving state of the vehicle V from the automatic driving state to the cooperative driving state. The process shown in FIG. 7 is repeatedly executed for each predetermined time, for example, until the request operation of the automatic driving start is input to the automatic driving ON/OFF switch 80, and then the request operation of the automatic driving end is performed. In addition, in a case of automatic switching to the automatic driving state when the automatic driving control of the vehicle V is in an enabled state in the vehicle control device 100, the vehicle control device 100 may start the process shown in FIG. 7 when the automatic driving control is in an enabled state, and repeatedly execute this process for each predetermined time until the automatic driving control is in a disabled state, or until the request operation of the automatic driving end is input to the automatic driving ON/OFF switch 80.

As shown in FIG. 7, the driving state determination unit 17a determines whether the stepping of the switch pedal 5 is detected by the stepped state detection unit 15 (S11). When the stepping of the switch pedal 5 is detected (S11: YES), the driving state determination unit 17a makes a determination of switching the driving state of the vehicle V from the automatic driving state to the cooperative driving state (S12). Meanwhile, when the current driving state of the vehicle V is the cooperative driving state, the driving state determination unit 17a makes a determination of maintaining the cooperative driving state as the driving state of the vehicle V.

Next, the driving state determination unit 17a calculates the degree of intervention on the basis of the current stepped amount of the switch pedal 5 which is detected by the stepped state detection unit 15 (S13). The travel control unit 17b controls the travel of the vehicle V so as to be switched to the cooperative driving state according to the calculated degree of intervention (S14).

On the other hand, when the stepping of the switch pedal 5 is not detected (S11: NO), the driving state determination unit 17a makes a determination of maintaining the automatic driving state as the driving state of the vehicle V when the current driving state of the vehicle V is the automatic driving state (S15). Meanwhile, when the current driving state of the vehicle V is the cooperative driving state, the driving state determination unit 17a makes a determination of switching the driving state of the vehicle V from the cooperative driving state to the automatic driving state. The travel control unit 17b then controls the travel of the vehicle V so as to be switched to the automatic driving state (S16).

Figure 8:
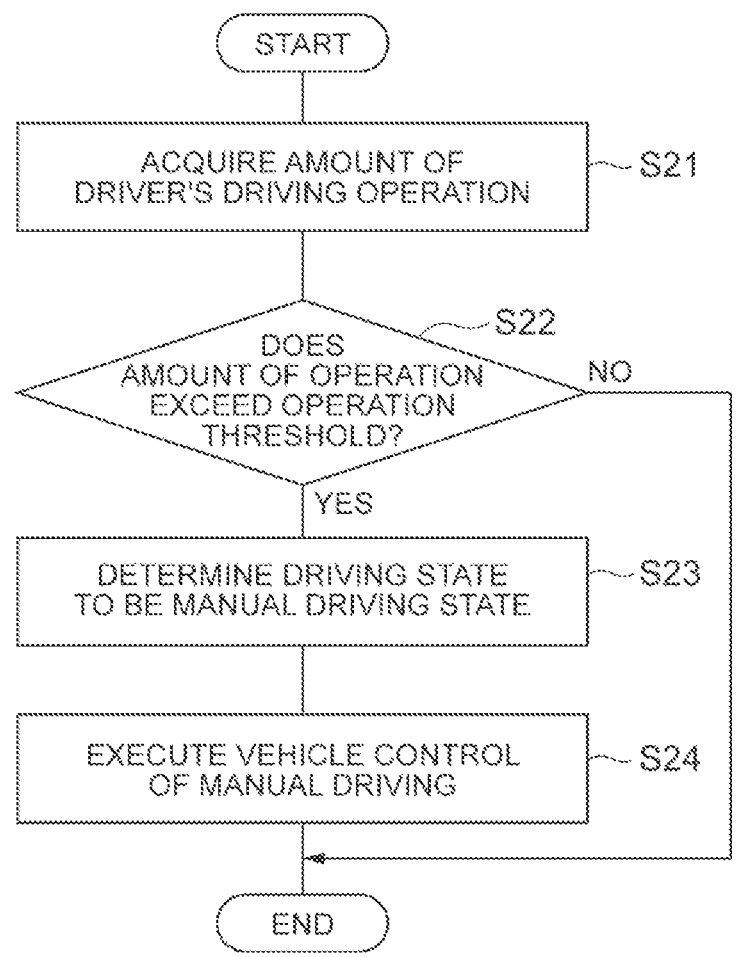
FIG. 8 is a flow diagram illustrating an example of a process of switching the driving state of a vehicle from the cooperative driving state to a manual driving state on the basis of a driver's driving operation.

Next, a description will be given of a process (override) of switching the driving state of the vehicle V from the cooperative driving state to the manual driving state on the basis of the driver's driving operation when the driving state of the vehicle V is the cooperative driving state. FIG. 8 is a flow diagram illustrating an example of a process of switching the driving state of the vehicle V from the cooperative driving state to the manual driving state on the basis of the driver's driving operation. The process shown in FIG. 8 is repeatedly executed for each predetermined time while the cooperative driving state is determined as the driving state of the vehicle V in the driving state determination unit 17a.

As shown in FIG. 8, the driving state determination unit 17a acquires the amount of the driver's driving operation (such as the amount of operation of the steering wheel) from the driving operation information acquisition unit 16 (S21). The driving state determination unit 17a determines whether the acquired amount of operation exceeds a predetermined operation threshold (S22). Meanwhile, as described above, this operation threshold may be changed on the basis of the stepped amount of the switch pedal 5 detected by the stepped state detection unit 15.

When the amount of operation exceeds the predetermined operation threshold (S22: YES), the driving state determination unit 17a makes a determination of switching the driving state of the vehicle V from the cooperative driving state to the manual driving state (S23). After the determination of switching of the driving state, the travel control unit 17b controls the travel of the vehicle V so as to be switched to the manual driving state (S24). On the other hand, when the amount of operation does not exceed the predetermined operation threshold (S22: NO), the driving state determination unit 17a starts the process from S21 again.

As described above, in the vehicle control device 100 according to the first embodiment, when the stepping of the switch pedal 5 provided on the left side rather than the accelerator pedal and the brake pedal is detected, the driving state of the vehicle V is switched from the automatic driving state to the cooperative driving state. That is, a driver steps the switch pedal 5 using his or her left foot which is not involved in the driving operation (operation of the accelerator pedal, operation of the brake pedal, and operation of the steering) of the vehicle V, and thus can deliver the intention of switching the driving state to the vehicle control device 100. In this manner, the vehicle control device 100 can accept the intention of switching to the cooperative driving state without interfering with the driver's driving operation.

The driving state switching unit 17 changes the degree of intervention of the amount of the driver's driving operation in the cooperative driving state, on the basis of the stepped amount of the switch pedal 5. In this case, the vehicle control device 100 can control the travel of the vehicle V by reflecting the degree of intervention which is intended by a driver in the cooperative driving state.

Second Embodiment

Figure 9:
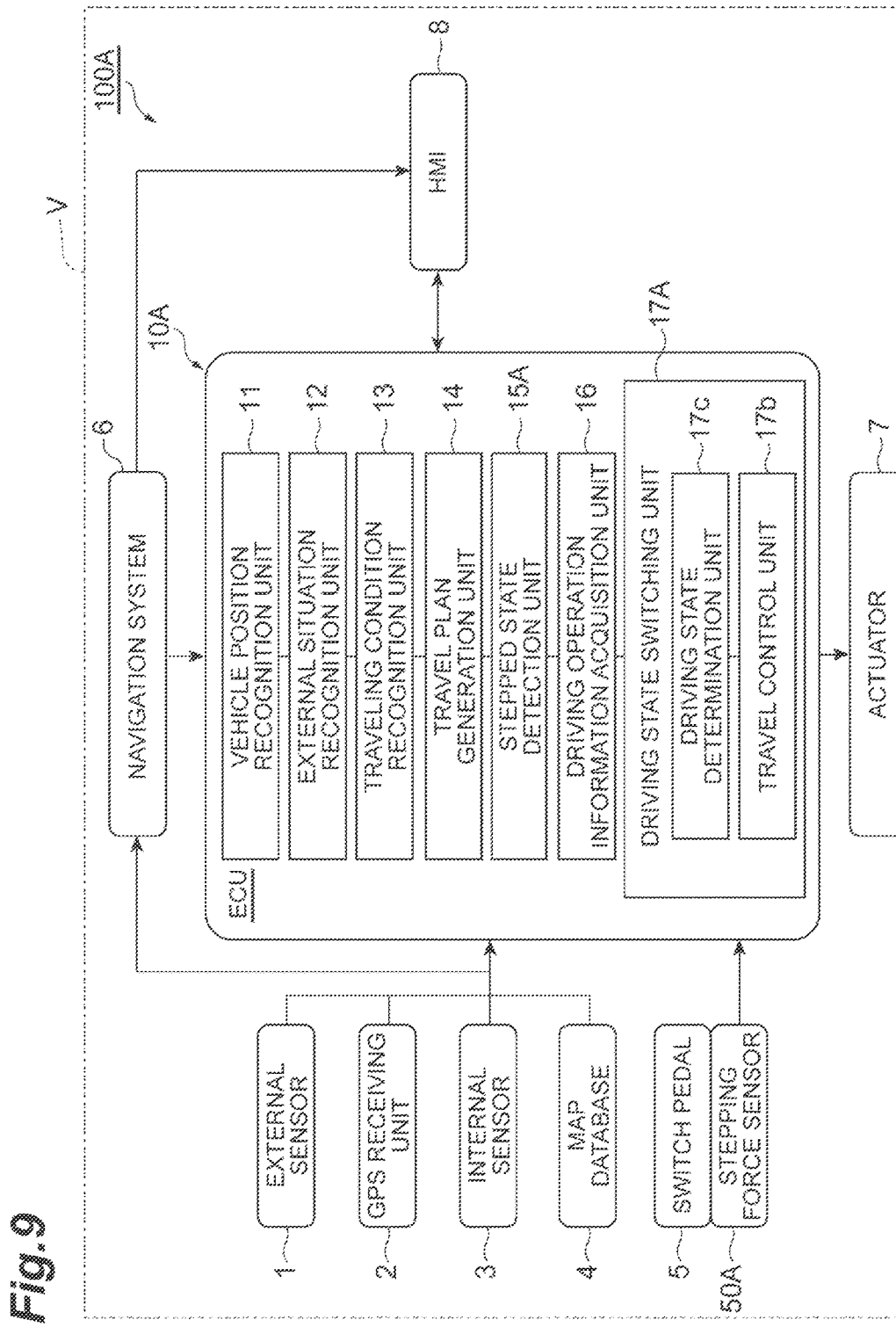
FIG. 9 is a block diagram illustrating a configuration of a vehicle control device according to a second embodiment.
Figure 10:
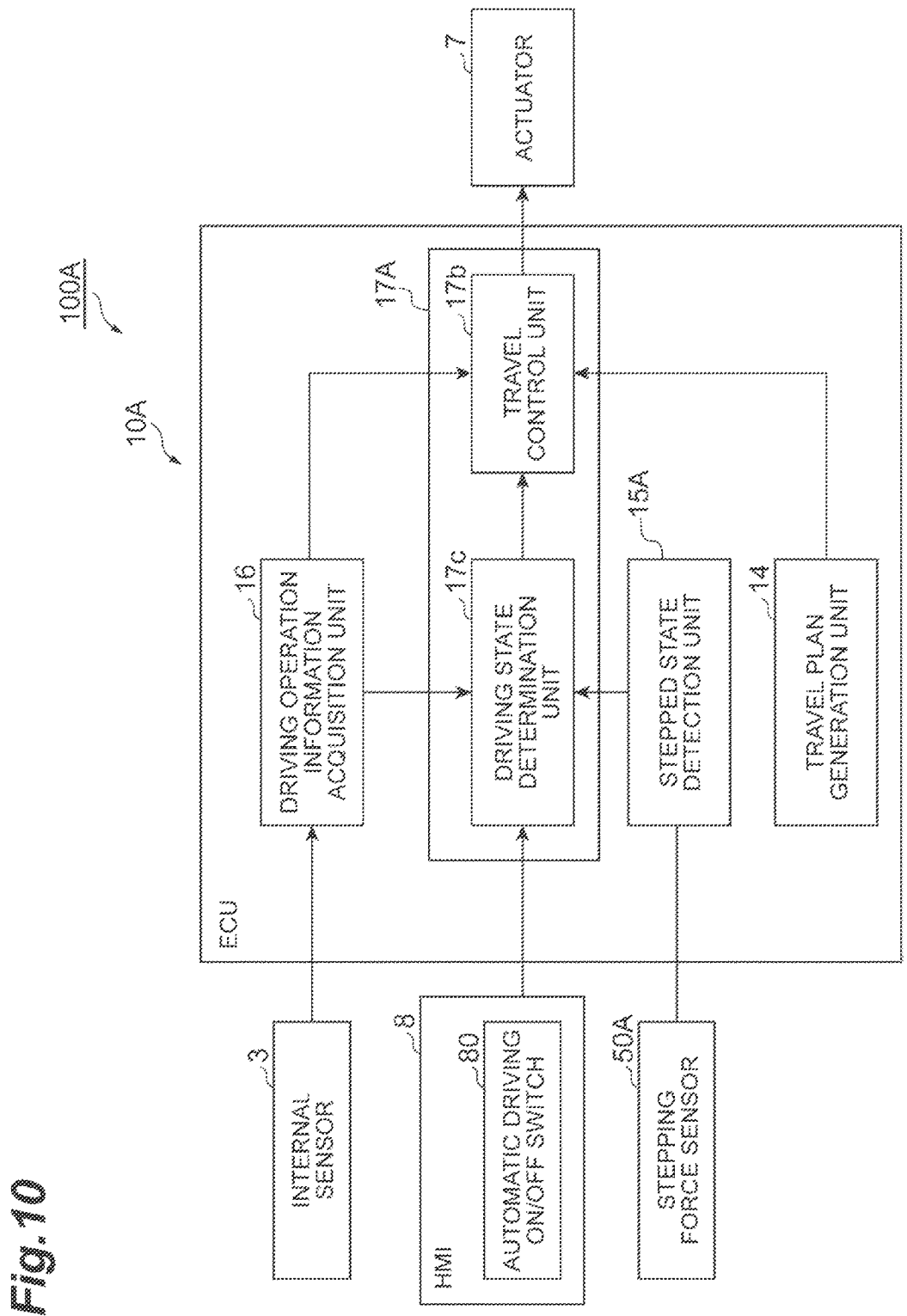
FIG. 10 is a block diagram illustrating of an ECU of FIG. 9.

Next, a second embodiment will be described. FIG. 9 is a block diagram illustrating a configuration of a vehicle control device 100A according to the second embodiment. FIG. 10 is a block diagram illustrating an ECU 10A in the vehicle control device 100A of FIG. 9. Meanwhile, in the description of the present embodiment, the same configurations and processes as those in the first embodiment will not be described, and differences from the first embodiment will be described. The vehicle control device 100A of the present embodiment includes a stepping force sensor 50A, instead of the stroke sensor 50 of the vehicle control device 100 in the first embodiment. In addition, the ECU 10A of the second embodiment includes a stepped state detection unit 15A and a driving state switching unit 17A which have different processing details, instead of the stepped state detection unit 15 and the driving state switching unit 17 of the ECU 10 according to the first embodiment.

Figure 11:
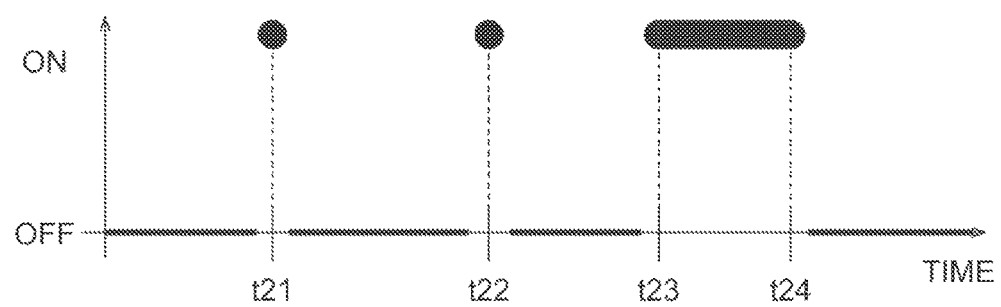
FIG. 11 is a diagram illustrating an example of the stepped state of the switch pedal.

The stepping force sensor 50A is a sensor that detects the stepped state of the switch pedal 5. When the switch pedal 5 is in a state of being stepped to the utmost by a driver, the stepping force sensor 50A outputs an ON signal indicating that the switch pedal 5 is stepped to the ECU 10A. In addition, while a state where the switch pedal 5 is stepped to the utmost is maintained, the stepping force sensor 50A continues to output the ON signal to the ECU 10A. When the switch pedal 5 is not in a state of being stepped to the utmost, the stepping force sensor 50A does not output the ON signal to the ECU 10A. FIG. 11 is a diagram illustrating an example of the stepped state of the switch pedal. In the example shown in FIG. 11, the switch pedal 5 is in a state of being stepped to the utmost by a driver at time t21 and time t22, and the ON signal is output from the stepping force sensor 50A to the ECU 10A. In addition, a state where the switch pedal 5 is stepped to the utmost by a driver is maintained between time t23 and time t24, and in this period, the ON signal continues to be output from the stepping force sensor 50A to the ECU 10A.

In addition, the stepping force sensor 50A can detect stepping force when the switch pedal 5 is stepped to the utmost by a driver, in addition to the detection of whether the switch pedal 5 is stepped. When the switch pedal 5 is a pedal shown in FIG. 3A, the stepping force sensor 50A outputs a signal according to force applied to the arm 51 by being stepped by a driver, as the stepping force, to the ECU 10A. In addition, when the switch pedal 5 is a pedal shown in FIG. 3B, the stepping force sensor 50A outputs a signal according to force applied to the button portion 52 by being stepped by a driver, as the stepping force of the switch pedal 5, to the ECU 10A.

The stepped state detection unit 15A detects the stepped state of the switch pedal 5 on the basis of the detection result of the stepping force sensor 50A. Specifically, the stepped state detection unit 15A detects whether the switch pedal 5 is stepped, and the stepping force of the switch pedal 5. Here, when the switch pedal 5 is stepped to the utmost (that is, when the ON signal is received), the stepped state detection unit 15A detects that the switch pedal 5 is stepped. The stepped state detection unit 15A outputs the detected stepped state of the switch pedal 5 to the driving state switching unit 17A.

Here, an example of the detection result of the stepped state of the switch pedal 5 in the stepped state detection unit 15A will be described with reference to FIG. 12. As shown in a second top graph in FIG. 12, the switch pedal 5 is stepped by a driver at time t32, time t33, time t34, and time t35. In addition, as shown in a third top graph in FIG. 11, stepping force when the switch pedal 5 is stepped by a driver at time t32, time t33, time t34, and time t35 is detected by the stepped state detection unit 15A.

The driving state switching unit 17A switches the driving state of the vehicle V to any of the automatic driving state, the cooperative driving state, and the manual driving state. In addition, in a case where the stepping of the switch pedal 5 is detected by the stepped state detection unit 15A when the driving state of the vehicle V is the automatic driving state, the driving state switching unit 17A switches the driving state of the vehicle V to the cooperative driving state. Further, when the driving state of the vehicle V is switched from the automatic driving state to the cooperative driving state by the stepping of the switch pedal 5 being detected by the stepped state detection unit 15A, the driving state switching unit 17A changes the degree of intervention of the amount of the driver's driving operation in the cooperative driving state, on the basis of the stepping force of the switch pedal 5 detected by the stepped state detection unit 15A.

Specifically, the driving state switching unit 17A includes a driving state determination unit 17c and a travel control unit 17b. The driving state determination unit 17c in the present embodiment is different from the driving state determination unit 17a in the first embodiment, in a process of making a determination of switching the driving state of the vehicle V from the automatic driving state to the manual driving state. Hereinafter, a description will be given with a focus on differences from the driving state determination unit 17a of the first embodiment.

Figure 12:
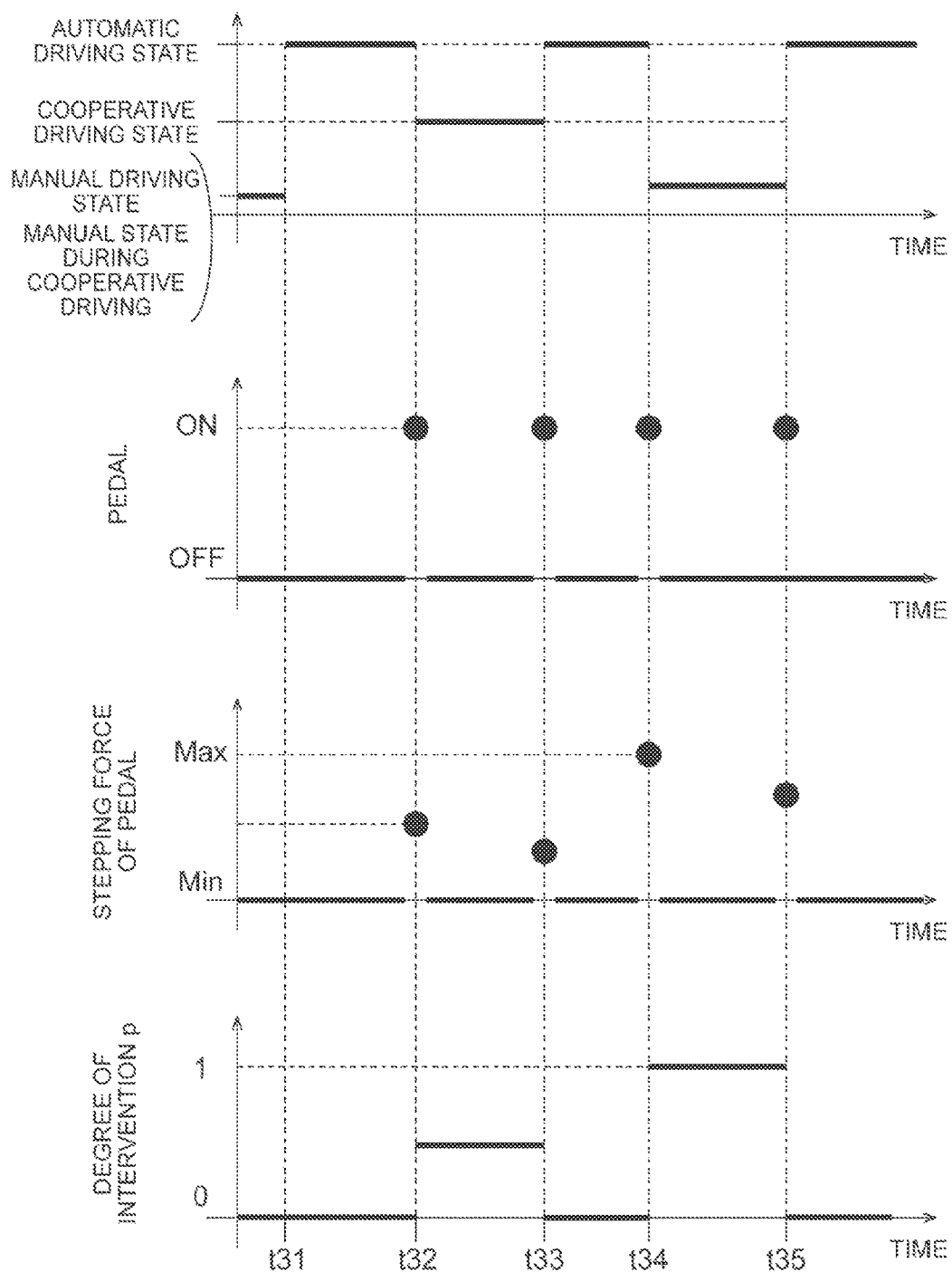
FIG. 12 is a diagram illustrating a relationship between each driving state, the state of the pedal, the stepping force of the pedal, and the degree of intervention when driving states are switched.

FIG. 12 is a diagram illustrating a relationship between each driving state, the state of the pedal, the stepping force of the pedal, and the degree of intervention when the driving state is switched. In the example shown in FIG. 12, at time t31, the driving state of the vehicle V is switched from the automatic driving state to the manual driving state. In a case where the stepping of the switch pedal 5 is detected by the stepped state detection unit 15A (time t32 in FIG. 12) when the driving state of the vehicle V is the automatic driving state (when the automatic driving state is determined), the driving state determination unit 17c makes a determination of switching the driving state of the vehicle V from the automatic driving state to the cooperative driving state. In a case where the stepping of the switch pedal 5 is detected by the stepped state detection unit 15A (time t33 in FIG. 12) when the driving state of the vehicle V is the cooperative driving state, the driving state determination unit 17c makes a determination of switching the driving state of the vehicle V from the cooperative driving state to the automatic driving state.

That is, after the driving state of the vehicle V is switched from the manual driving state to the automatic driving state by the operation of the automatic driving ON/OFF switch 80, or the like, the driving state determination unit 17c alternately switches the driving state of the vehicle V between the automatic driving state and the cooperative driving state whenever the stepping of the switch pedal 5 is detected by the stepped state detection unit 15A.

When the stepping of the switch pedal 5 is detected by the stepped state detection unit 15A, the driving state determination unit 17c calculates the degree of intervention of the amount of the driver's driving operation in the cooperative driving state, in accordance with the stepping force of the switch pedal 5. The driving state determination unit 17c makes the degree of intervention larger as the stepping force of the switch pedal 5 becomes larger. When the stepping force of the switch pedal 5 is largest (when the stepping force is Max), the driving state determination unit 17c maximizes the degree of intervention of the amount of the driver's driving operation. Meanwhile, when the stepping force of the switch pedal 5 is largest, a case where the value of the stepping force detected by the stepped state detection unit 15A is equal to or greater than a predetermined value may be set to a case where the stepping force of the switch pedal 5 is largest. Alternatively, a case where the maximum stepping force capable of being detected by the stepping force sensor 50A is detected may be set to a case where the stepping force of the switch pedal 5 is largest. In the example shown in FIG. 12, the driving state determination unit 17c calculates the degree of intervention between greater than 0 and equal to or less than 1 in accordance with the stepping force of the switch pedal 5. Meanwhile, in a case where the switch pedal 5 is stepped when the driving state of the vehicle V is the automatic driving state, the driving state determination unit 17c may calculate the degree of intervention.

When the cooperative driving state is determined as the driving state of the vehicle V, the driving state determination unit 17c makes a determination (determination of override) of switching the driving state of the vehicle V from the cooperative driving state to the manual driving state, on the basis of the driving operation information acquired by the driving operation information acquisition unit 16. Specifically, when the amount of the driver's driving operation exceeds the predetermined operation threshold, the driving state determination unit 17c makes a determination of switching the driving state of the vehicle V from the cooperative driving state to the manual driving state. For example, in at least any of a case where the amount of operation of the steering wheel exceeds the predetermined operation threshold, a case where the amount of operation of the accelerator pedal exceeds the predetermined operation threshold, and a case where the amount of operation of the brake pedal exceeds the predetermined operation threshold, the driving state determination unit 17c makes a determination of switching the driving state of the vehicle V from the cooperative driving state to the manual driving state. Further, the driving state determination unit 17c may change the predetermined operation threshold compared with the amount of the driver's driving operation, on the basis of the stepping force of the switch pedal 5 detected by the stepped state detection unit 15A. For example, the driving state determination unit 17c may increase the predetermined operation threshold as the stepping force of the switch pedal 5 becomes larger. However, it is not necessarily required for the driving state determination unit 17c to make a determination of switching the driving state from the cooperative driving state to the manual driving state on the basis of the driving operation information. Even when there is a large driving operation performed by a driver, the driving state determination unit 17c may maintain the cooperative driving state as the driving state of the vehicle V.

When the driving state determined by the driving state determination unit 17c is the cooperative driving state, the travel control unit 17b changes the degree of intervention of the amount of the driver's driving operation on the basis of the degree of intervention calculated by the driving state determination unit 17c.

In the example shown in FIG. 12, the driving state is switched from the automatic driving state to the cooperative driving state by the switch pedal 5 being stepped at time t32. In addition, the degree of intervention p is calculated by the driving state determination unit 17c in accordance with the stepping force of the switch pedal 5 at this time. The travel control unit 17b controls the travel of the vehicle V so that the degree of intervention according to the calculated degree of intervention p is set when the cooperative driving state is controlled at time t32 and the subsequent times. When the switch pedal 5 is stepped at time t33, the driving state is switched from the cooperative driving state to the automatic driving state. When the switch pedal 5 is stepped at time t34, the driving state is switched from the automatic driving state to the cooperative driving state. Since the stepping force of the switch pedal 5 is maximum at this time, the driving state determination unit 17c calculates 1 as the degree of intervention p. Thereby, when the cooperative driving state is controlled at time t34 and the subsequent times, the travel control unit 17b controls the travel of the vehicle V in the manual state during cooperative driving which is a state where only the driver's driving operation is temporarily reflected. When the switch pedal 5 is stepped at time t35, the driving state is switched from the cooperative driving state to the automatic driving state.

Figure 13:
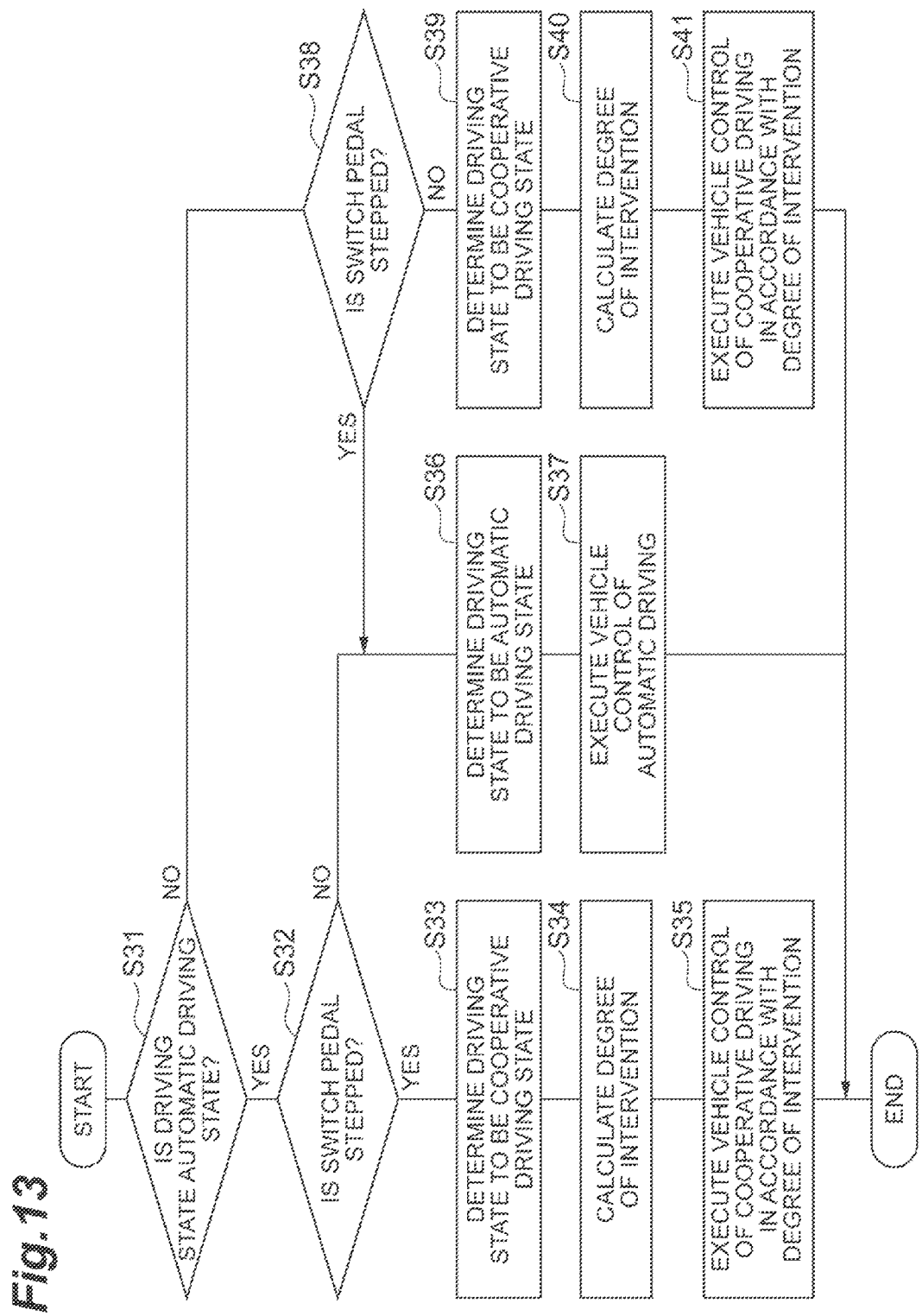
FIG. 13 is a flow diagram illustrating an example of a process of switching the driving state of a vehicle from the automatic driving state to the cooperative driving state.

Next, a description will be given of a process of switching to the cooperative driving state according to the stepping of the switch pedal 5 by a driver when the driving state of the vehicle V is the automatic driving state. FIG. 13 is a flow diagram illustrating an example of a process of switching the driving state of the vehicle V from the automatic driving state to the cooperative driving state. The process shown in FIG. 13 is repeatedly executed for each predetermined time, for example, until the request operation of the automatic driving start is input to the automatic driving ON/OFF switch 80, and then the request operation of the automatic driving end is performed. In addition, in a case of automatic switching to the automatic driving state when the automatic driving control of the vehicle V is in an enabled state in the vehicle control device 100A, the vehicle control device 100A may start the process shown in FIG. 13 when the automatic driving control is in an enabled state, and repeatedly execute this process for each predetermined time until the automatic driving control is in a disabled state, or until the request operation of the automatic driving end is input to the automatic driving ON/OFF switch 80.

As shown in FIG. 13, the driving state determination unit 17c determines whether the current driving state of the vehicle V is the automatic driving state (S31). When the current driving state of the vehicle V is the automatic driving state (S31: YES), the driving state determination unit 17c determines whether the stepping of the switch pedal 5 is detected by the stepped state detection unit 15A (S32). When the stepping of the switch pedal 5 is detected (S32: YES), the driving state determination unit 17c makes a determination of switching the driving state of the vehicle V from the automatic driving state to the cooperative driving state (S33).

Next, the driving state determination unit 17c calculates the degree of intervention on the basis of the stepping force of the switch pedal 5 which has recently been detected by the stepped state detection unit 15A (S34). The travel control unit 17b controls the travel of the vehicle V so as to be switched to the cooperative driving state according to the calculated degree of intervention (S35).

On the other hand, when the stepping of the switch pedal 5 is not detected (S32: NO), and the current driving state of the vehicle V is the automatic driving state (when the process of S36 is performed next to S32), the driving state determination unit 17c makes a determination of maintaining the automatic driving state as the driving state of the vehicle V (S36). Meanwhile, when the current driving state of the vehicle V is the cooperative driving state (when the process of S36 is performed next to S38), the driving state determination unit 17c makes a determination of switching the driving state of the vehicle V from the cooperative driving state to the automatic driving state (S36). The travel control unit 17b then controls the travel of the vehicle V so as to be switched to the automatic driving state (S37).

In addition, when the driving state of the vehicle V is a state of being switched from the automatic driving state to the cooperative driving state (S31: NO), the driving state determination unit 17c determines whether the stepping of the switch pedal 5 is detected by the stepped state detection unit 15A (S38). When the stepping of the switch pedal 5 is detected (S38: YES), the driving state determination unit 17c proceed to the process of S36. On the other hand, when the stepping of the switch pedal 5 is not detected (S38: NO), the driving state determination unit 17c makes a determination of maintaining the cooperative driving state as the driving state of the vehicle V (S39). Next, the driving state determination unit 17c calculates the degree of intervention on the basis of the stepping force of the switch pedal 5 which has recently been detected by the stepped state detection unit 15A (S40). The travel control unit 17b controls the travel of the vehicle V so as to be switched to the cooperative driving state according to the calculated degree of intervention (S41).

As described above, in the vehicle control device 100A according to the second embodiment, when the stepping of the switch pedal 5 provided on the left side rather than the accelerator pedal and the brake pedal is detected, the driving state of the vehicle V is switched from the automatic driving state to the cooperative driving state. That is, a driver steps the switch pedal 5 using his or her left foot which is not involved in the driving operation (operation of the accelerator pedal, operation of the brake pedal, and operation of the steering) of the vehicle V, and thus can deliver the intention of switching the driving state to the vehicle control device 100A. In this manner, the vehicle control device 100A can accept the intention of switching to the cooperative driving state without interfering with the driver's driving operation.

The driving state switching unit 17A changes the degree of intervention of the amount of the driver's driving operation in the cooperative driving state, on the basis of the stepping force of the switch pedal 5. In this case, the vehicle control device 100A can control the travel of the vehicle V by reflecting the degree of intervention which is intended by a driver in the cooperative driving state.

As stated above, the embodiments of the present invention have been described, but the present invention is not limited to the embodiments. For example, when the degree of intervention of the amount of the driver's driving operation is changed on the basis of the degree of intervention calculated by the driving state determination units 17a and 17c, the target steering torque or the like is calculated on the basis of Expression (1), but the degree of intervention may be changed by methods other than a method using Expression (1).

In the first embodiment, when the travel of the vehicle V is controlled so as to be switched to the cooperative driving state, it is not necessarily required to perform a process of changing the degree of intervention of a driver on the basis of the stepped amount of the switch pedal 5. Similarly, in the second embodiment, when the travel of the vehicle V is controlled so as to be switched to the cooperative driving state, it is not necessarily required to perform a process of changing the degree of intervention of a driver on the basis of the stepping force of the switch pedal 5.

The travel plan generation unit 14 is not limited to the generation of a travel plan on the basis of the position of the vehicle V, the external situation of the vehicle V, the traveling condition of the vehicle V, and the map information of the map database 4. For example, the travel plan generation unit 14 may generate a travel plan relating to steering on the basis of the external situation of the vehicle V recognized by the external situation recognition unit 12 and the traveling condition of the vehicle V recognized by the traveling condition recognition unit 13. This travel plan relating to steering may be, for example, a plan for making the vehicle V travel along a white line recognized by the traveling condition recognition unit 13. In addition, for example, the travel plan generation unit 14 may generate a travel plan relating to speed on the basis of the external situation of the vehicle V recognized by the external situation recognition unit 12 and the traveling condition of the vehicle V recognized by the traveling condition recognition unit 13. This travel plan relating to speed may be, for example, a travel plan for making the vehicle V travel following a vehicle traveling in front of the vehicle V. In addition, for example, the travel plan generation unit 14 may generate a travel plan relating to steering and speed on the basis of the external situation of the vehicle V recognized by the external situation recognition unit 12 and the traveling condition of the vehicle V recognized by the traveling condition recognition unit 13. This travel plan relating to steering and speed may be a travel plan for controlling the steering and speed of the vehicle V so as to avoid an obstacle located in front of the vehicle V. Travel plans which are generated by the travel plan generation unit 14 are not limited to the above-described travel plans, and may be other travel plans in a case of travel plans used for controlling the travel of the vehicle V.

In addition, in each of the embodiments, the switch pedal 5 is provided on the left side of the accelerator pedal and the brake pedal, however, in a case of a vehicle operating the accelerator pedal and the brake pedal using a left foot, the switch pedal 5 may be provided on the right side of these pedals.

What is claimed is:

1. A vehicle control device capable of switching a driving state of a vehicle that travels using a travel plan generated on the basis of a surrounding environment of the vehicle and a state of the vehicle, or generated on the basis of a position of the vehicle, the surrounding environment of the vehicle, the state of the vehicle, and map information, the device comprising:
    a switch pedal configured to be provided on a left side of the vehicle, and to the left side of an accelerator pedal and a brake pedal of the vehicle, in a placement portion on which a driver who sits on a driving seat of the vehicle places his or her feet; and
    an electronic control unit (ECU) programmed to:
    detect a stepped state of the switch pedal; and
    switch the driving state of the vehicle to an automatic driving state where travel of the vehicle is controlled using the travel plan, a cooperative driving state where the vehicle is made to travel in cooperation with a driving operation on the basis of the travel plan and an amount of the driver's driving operation relating to at least one of a steering operation of the vehicle, an operation of the accelerator pedal, and an operation of the brake pedal, and a manual driving state where the amount of the driver's driving operation is reflected in the travel of the vehicle,
    wherein the ECU is further programmed to switch the driving state of the vehicle to the cooperative driving state in a case where stepping of the switch pedal is detected by the stepped state detection unit when the driving state of the vehicle is the automatic driving state.

2. The vehicle control device according to claim 1, wherein the ECU is further programmed to:
    detect a stepped amount of or stepping force of the switch pedal as the stepped state, and change a degree of intervention of the amount of the driver's driving operation in the cooperative driving state, on the basis of the stepped amount of or stepping force of the switch pedal detected by the ECU.

* * * * *